(12) United States Patent
Greif

(10) Patent No.: US 6,438,489 B1
(45) Date of Patent: Aug. 20, 2002

(54) NAVIGATION SYSTEM WITH AUTOMATIC CHANGE OF DATA MEDIUM

(75) Inventor: Thomas Greif, Bonn (DE)

(73) Assignee: Mannesmann VDO AG, Frankfurt am Main (DE)

( * ) Notice: Subject to any disclaimer, the term of this patent is extended or adjusted under 35 U.S.C. 154(b) by 0 days.

(21) Appl. No.: 09/678,135

(22) Filed: Oct. 4, 2000

(30) Foreign Application Priority Data

Oct. 5, 1999 (DE) .......................................... 199 47 790

(51) Int. Cl.[7] .............................................. G01C 21/36
(52) U.S. Cl. ........................................ 701/209; 701/201
(58) Field of Search ................................ 701/201, 202, 701/209, 211; 340/995

(56) References Cited

U.S. PATENT DOCUMENTS

| | | | |
|---|---|---|---|
| 5,515,284 A | 5/1996 | Abe | 364/444 |
| 5,790,975 A | 8/1998 | Kashiwazaki et al. | 701/208 |
| 5,944,768 A * | 8/1999 | Ito et al. | 340/990 |
| 5,970,390 A * | 10/1999 | Koga et al. | 381/14 |
| 6,064,323 A * | 5/2000 | Ishii et al. | 340/990 |
| 6,240,347 B1 * | 5/2001 | Everhart et al. | 367/197 |
| 6,298,302 B2 * | 10/2001 | Walgers et al. | 340/905 |

FOREIGN PATENT DOCUMENTS

| | | |
|---|---|---|
| DE | 39 04 344 | 8/1990 |
| DE | 39 10 194 | 9/1990 |
| DE | 44 29 121 | 2/1996 |
| EP | 0 798 539 | 3/1997 |
| EP | 0 892 341 A1 * | 1/1999 |
| JP | 03007983 | 1/1991 |
| JP | 05046090 | 2/1993 |
| JP | 08285617 | 11/1996 |

* cited by examiner

*Primary Examiner*—Michael J. Zanelli
(74) *Attorney, Agent, or Firm*—Cohen, Pontani, Lieberman & Pavane

(57) ABSTRACT

A navigation system for journeys beyond national borders in which the data medium needs to be changed includes a reader designed to hold a plurality of changeable data media and to read data selectively from one of the data media. The navigation system also includes means for selecting a data medium on the basis of the vehicle position. Hence, when a national border is crossed, the navigation system will automatically change the data medium, which means that continuous navigation is ensured without any action from the user.

9 Claims, 2 Drawing Sheets

NAVIGATION SYSTEM WITH AUTOMATIC CHANGE OF DATA MEDIUM

BACKGROUND OF THE INVENTION

1. Field of the Invention

The present invention relates to a navigation system for a motor vehicle having a processor for calculating a route between a starting location and a destination, a reader connected to the processor for reading map data from a data medium, means for determining the vehicle position, an input unit connected to the processor and an output unit connected to the processor.

2. Description of the Related Art

Navigation systems for use in motor vehicles are known. The map data required for route calculation is stored on a changeable data medium which generally comprises a CD-ROM. The map data stored on the CD-ROM covers a particular geographical area, which is usually bounded by the borders of a country (in Europe) or a state (in the United States). On journeys beyond the national or state borders, the CD-ROM therefore needs to be changed when the border is crossed, and the CD-ROM for the particular country or state which the motor vehicle is entering needs to be inserted. In addition, the driver then needs to input the new destination, so that the route can be calculated. This procedure is frequently regarded as unsatisfactory.

SUMMARY OF THE INVENTION

The object of the present invention is therefore to specify a navigation system which ensures simplified operation, even when leaving the geographical area whose map data is stored on the currently inserted CD-ROM.

The object of the present invention is achieved by a reader designed to hold a plurality of changeable data media and to read data selectively from one of the data media. The object of the present invention is also met by a navigation system containing means for selecting a data medium on the basis of the vehicle position. The navigation system according to the present invention includes a reader into which a plurality of data media may be inserted. When the data media comprise CD-ROMs, the reader comprises a CD changer. A plurality of CD-ROMs may be inserted into the CD changer and data is read from one of these CD-ROMs. The navigation system according to the present invention may additionally include means for selecting a data medium on the basis of the vehicle position. Navigation systems constantly ascertain vehicle position so that the required navigation information is output at the correct time. The vehicle position which is already determined by the navigation system may additionally be used to determine whether the geographical location corresponding to the vehicle position is available on one of the available CD-ROMs and possibly which CD-ROM it is on. This feature enables automatic selection of that CD-ROM which contains the geographical data for the current position.

On journeys in two different countries whose map data is stored on two different CD-ROMs, the starting location and the destination may, for example, be input into the navigation system. In addition, the location of a border crossing as an intermediate destination may also be input. The route is then first planned between the starting location and the intermediate destination using the first CD-ROM which contains the starting location. When the intermediate destination is reached, the first CD-ROM is changed and a route is planned from the intermediate destination to the destination. In this case, the CD changer is controlled by the processor which is running an appropriate computer program.

In an alternative embodiment, the navigation system is designed for route calculation using at least two databases which are stored on different data media. In this alternative embodiment, the driver merely inputs the starting location and the destination. The route is then planned with automatic selection of an intermediate destination.

Under some circumstances, a reader which is able to hold a plurality of data media cannot be arranged in the immediate vicinity of the processor for space reasons. This means that, when the processor is connected to the reader in the motor vehicle, relatively long distances sometimes need to be bridged using cable. In one particular embodiment according to the present invention, the reader and the processor to be connected via a wireless connection such as, for example, by a radio interface.

The navigation information may be output both via an audio output unit and via a visual output unit. The destination, for example, may be input using a keypad. In an optional embodiment, a voice input unit is connected to the processor thereby allowing an input to be made during the journey.

So that alternative routes may also be offered to the driver in the event of traffic obstructions on the originally planned route, the navigation system may be connected to an appliance for receiving traffic information so that traffic information may be taken into account during calculation of a route. Instead of being connected to an appliance, the navigation system may include such an appliance. The appliance for receiving traffic information may, for example, comprise a car radio having a Radio Data System/Traffic Management Channel (RDS/TMC) reception part, so that the traffic information transmitted by the radio stations as background to the program in progress can be received and forwarded directly to the navigation system for further processing. Alternatively, the appliance for receiving traffic information may also include a mobile radio connected to the navigation system. Mobile radio providers also provide traffic information which can be forwarded to the navigation system from the mobile radio for further processing. Particularly in the latter case, a wire-less link between the mobile radio and the navigation appliance is again preferred. More specifically, the mobile radio may be connected to the processor via a short-distance radio link based on the Bluetooth method.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below with the aid of an illustrative embodiment and the drawing, in which.

DETAILED DESCRIPTION OF THE PRESENTLY PREFERRED EMBODIMENTS

Figure 1:
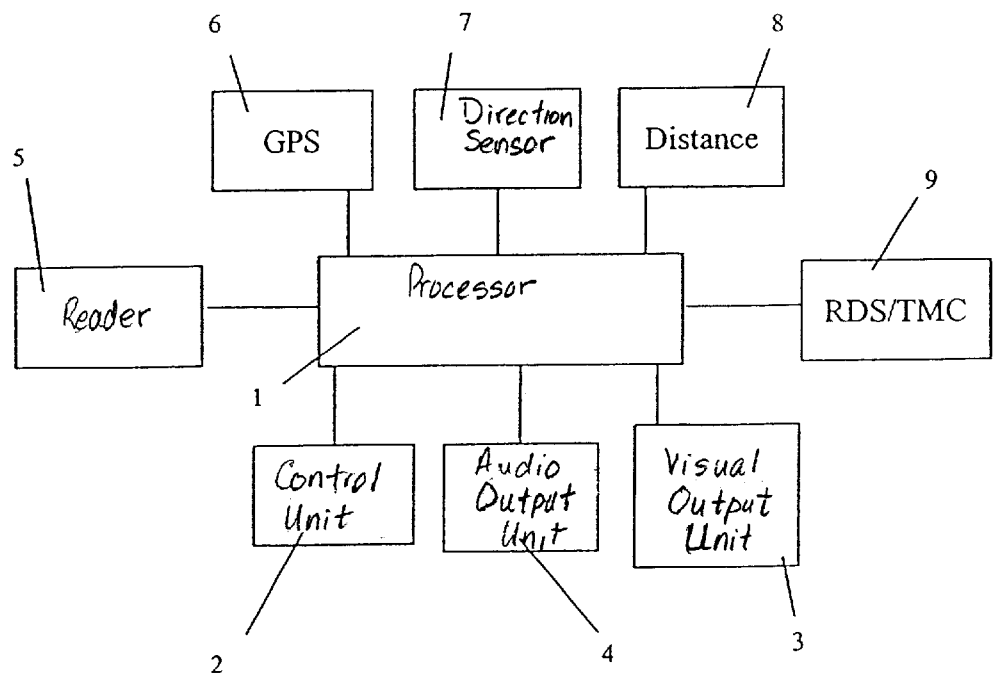
FIG. 1 is a schematic diagram of a navigation system according to an embodiment of the present invention.

FIG. 1 is a schematic illustration of the components of a navigation system for motor vehicles. The central component part of the navigation system is a processor 1 which also comprises memory elements. The processor 1 runs the programs for route planning and for outputting navigation information. The processor 1 also controls a plurality of peripheral units of the navigation system. A control unit 2 is connected to the processor 1 which may, for example, be used to input or to select a destination. The control unit 2 may be accommodated in the same housing as the processor 1. Alternatively, the control unit 2 may also be in the form of a remote control connected to the processor 1 by, for example, a visual interface or a radio interface. A visual output unit 3 is also connected to the processor 1 which is used to output navigation information and other information. The navigation information may also be output audibly via an audio output unit 4, i.e., loudspeaker. A reader 5 is also connected to the processor 1 into which data media containing map data may be inserted. According to the invention, the reader 5 is a CD changer into which a plurality of CD-ROMs containing map data for different geographical areas may be inserted. The reader 5 is controlled directly by the processor 1. When the starting location and destination are known, the processor 1 uses the map data in a known manner to calculate the optimum route which is then be output via the visual output unit 3 and/or the audio output unit 4.

To determine the current vehicle position, the navigation system comprises a receiver 6 for receiving satellite navigation signals, i.e., a GPS. To determine a vehicular position independent of satellites, the navigation system also comprises a direction sensor 7 and a distance sensor 8, which are likewise connected to the processor 1. The direction sensor 7 and distance sensor 8 allow a suitable computer program to be used for position determination. The computer program for the navigation system that is running in the processor 1 is designed such that, on the basis of the currently ascertained vehicle position, a check is carried out to determine which of the data media inserted in the drive 5 contains the present geographical vehicle position. The data medium containing the present vehicle position is selected and the map data stored on it is used for route calculation. Navigation information based on the route calculation is also output. If, on the basis of the particular vehicle position, it is established that the geographical border of the geographical area stored on the current data medium is reached, then the other available data media are checked to determine whether they contain the present vehicle position. Accordingly, it is always possible to select the CD-ROM which contains the map data for the current vehicle position.

In the illustrative embodiment shown in FIG. 1, the processor 1 is additionally connected to a radio receiver 9 designed to receive Radio Data System/Traffic Management Channel (RDS/TMC) signals. This arrangement allows traffic information received by the radio receiver to be forwarded to the processor 1 so that the traffic information is taken into account during route calculation.

Figure 2:
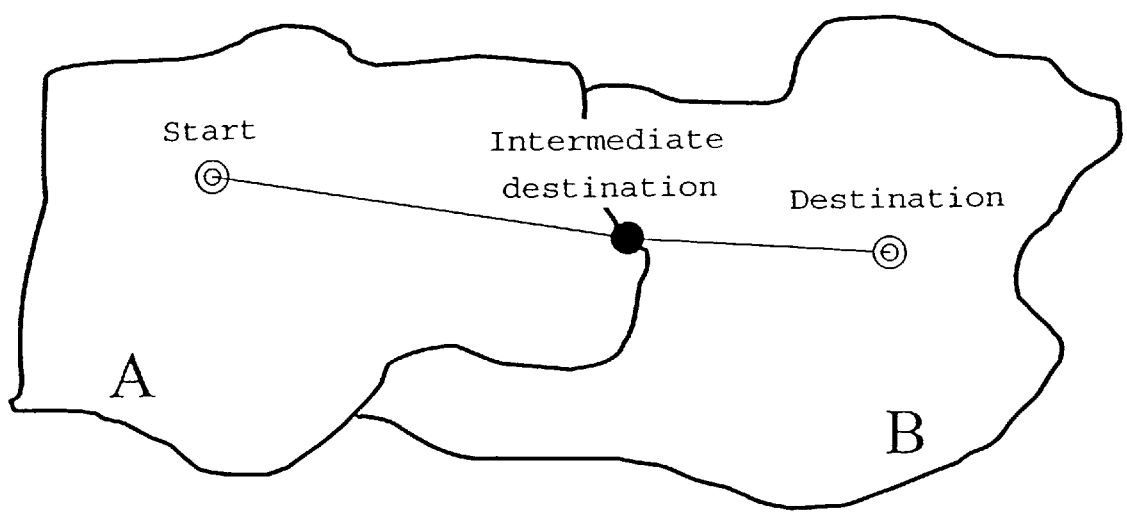
FIG. 2 is a schematic diagram of a map illustrating a route to be calculated.

For the purpose of more detailed explanation, FIG. 2 is a schematic illustration of a map showing countries A and B, which each represent closed geographical areas. The map data for country A and country B are in each case stored fully on separate CD-ROMs. On a journey from a starting location situated in country A to a destination situated in country B, it is therefore necessary for the CD-ROM containing the map data to be changed. This can be done at the intermediate destination, for example, which represents a border location between countries A and B. In the navigation system according to the present invention, both CD-ROMs are inserted into the CD changer. The current vehicle position is used to ascertain the starting location and to select a first CD-ROM which contains the starting location. In the example illustrated, the first CD-ROM is the CD-ROM containing the map data for country A. Route calculation and navigation up to the intermediate destination are performed using the first CD-ROM. The navigation system automatically recognizes when the intermediate destination has been reached by constantly determining the position of the vehicle. If this intermediate destination is reached, an automatic query is made regarding which CD-ROM contains the present vehicle position, which is now in country B. A second CD-ROM is now selected and may be used for route calculation and navigation without requiring any intervention by the user of the system. To ensure smooth navigation, it is also possible, within the scope of the invention, to change the CD-ROM shortly before the intermediate destination is reached and to carry out further route calculation. To this end, the navigation information still remaining for the remainder of the journey in country A is stored in a memory.

Figure 3:
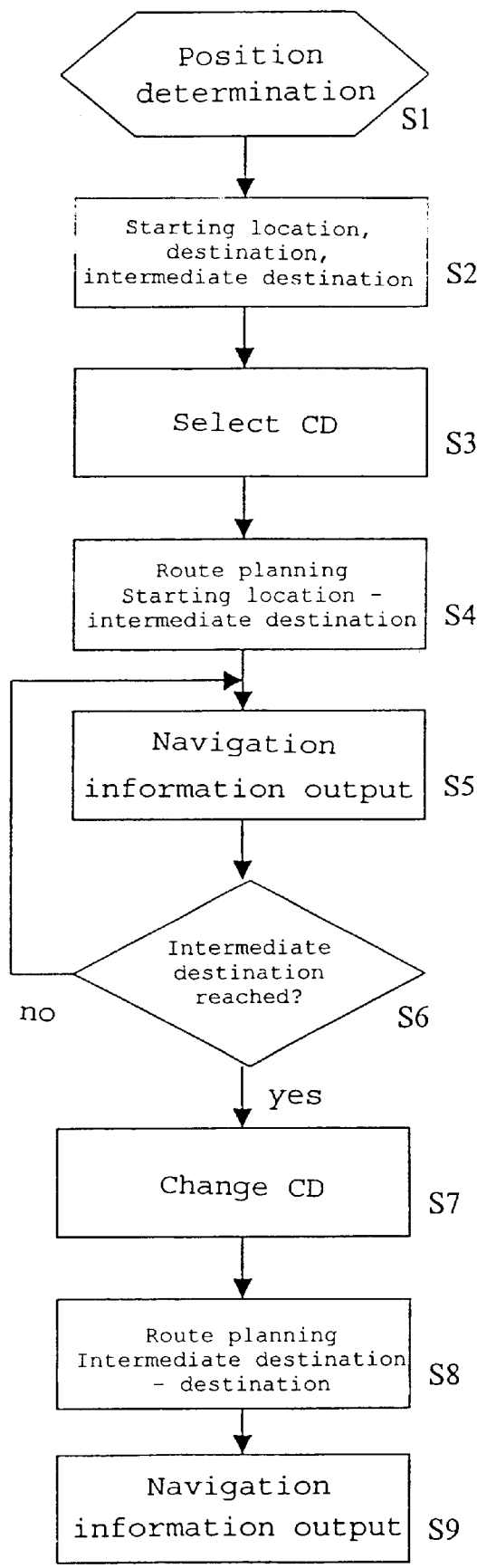
FIG. 3 is a flowchart depicting a method for selecting a CD-ROM according to an embodiment of the present invention.

FIG. 3 is a flow chart showing a simplified method for the selection of the CD-ROM required for a route from one geographical boundary to another. In step SI, the vehicle position is first determined. The vehicle position is also ascertained subsequently on a continual basis in parallel with the other method steps. After initially determining the vehicle location, the starting location and the destination, as well as the intermediate destination at which the border is to be crossed are input, step S2. Instead of inputting the starting location, the current vehicle position can also be selected automatically as the starting location, provided that it is available. Next, a first CD-ROM containing the present vehicle position, e.g., the starting location, is selected, step S3. A route is then planned between the starting location and the intermediate destination using the first CD-ROM, step S4. Navigation information is output after the route is planned to the intermediate destination, step S5. Step S5 continues until the intermediate destination is reached. In this context, continuous evaluation of the current vehicle position detects whether the intermediate destination has been reached. Once it is determined that the intermediate destination has been reached, the CD-ROM is changed, step S7. More specifically, a second CD-ROM containing the present location of the vehicle is now selected. The map data on the second CD-ROM is now used to plan the route between the intermediate destination and the destination, step S8. Navigation information is output after the route is planned to the destination until the destination is reached, step S9.

The method has been explained on the basis of a simple example, for which a journey into an adjoining country was assumed. If the journey from the starting location to the destination requires that a plurality of countries be crossed, then it is a simple matter to modify the method by inputting a plurality of intermediate destinations. In addition, in a more convenient refinement of the invention, the intermediate destinations are automatically determined by the route calculation program when the starting location and the destination are known.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A navigation system for a motor vehicle, comprising:
   a processor operatively arranged for calculating a route between a starting location and a destination;
   a reader connected to said processor for reading map data from a data medium, said reader operatively arranged for holding a plurality of changeable data media and reading selectively from one of the plural changeable media, wherein said processor comprises means for calculating the route using at least two databases stored on separate data media in said reader;
   means for determining a vehicle position, said means for determining being connected to said processor;
   an input unit connected to said processor operatively arranged for allowing user input of the starting location and the destination;
   an output unit connected to said processor; and
   means for selecting one of the plural changeable data media in response to a vehicle position determined by said means for determining a vehicle position.

2. The navigation system of claim 1, wherein the plural changeable data media comprise CD-ROMs and said reader comprises a CD changer.

3. The navigation system of claim 1, wherein said reader is connected to said processor via a radio interface.

4. The navigation system of claim 1, wherein said output unit comprises at least one of an audio output unit and a visual output unit.

5. The navigation system of claim 1, wherein said input unit comprises a voice input unit.

6. The navigation system of claim 1, wherein said processor is connectable to an appliance for receiving traffic information and for taking the traffic information into account during calculation of the route.

7. The navigation system of claim 1, further comprising an appliance for receiving traffic information, wherein said appliance is connected to said processor and said processor is operatively arranged for taking the traffic information into account during calculation of the route.

8. The navigation system of claim 7, wherein said appliance comprises a car radio.

9. The navigation system of claim 7, wherein said appliance comprises a mobile radio.

* * * * *